United States Patent [19]
Mori

[11] Patent Number: 5,856,002
[45] Date of Patent: Jan. 5, 1999

[54] POLYMERIC FOAM WITH ANTIBACTERIAL AND MILDEWPROOFING FUNCTIONS

[76] Inventor: Shoji Mori, 4-35-18, Niwashiro-dai, Sakai, Osaka, Japan

[21] Appl. No.: 962,006

[22] Filed: Oct. 31, 1997

[30] Foreign Application Priority Data

Nov. 1, 1996 [JP] Japan ................................ 8-327510

[51] Int. Cl.$^6$ ....................................................... C08J 9/00
[52] U.S. Cl. .............................. 428/334; 521/89; 521/94; 521/95
[58] Field of Search ................................ 521/149, 89, 95

[56] References Cited

U.S. PATENT DOCUMENTS

| | | | |
|---|---|---|---|
| 3,912,666 | 10/1975 | Spitzer et al | 521/72 |
| 3,912,667 | 10/1975 | Spitzer et al | 521/65 |
| 4,422,877 | 12/1983 | Spitzer et al | 521/79 |

*Primary Examiner*—Morton Foelak
*Attorney, Agent, or Firm*—Wenderoth, Lind & Ponack, L.L.P.

[57] ABSTRACT

A polymeric foam which comprises a polymer and a small amount of organic composite having a bactericidal action contained therein, said organic composite being composed mainly of N,N-dimethyl-N'-phenyl-N'-(fluorodichloromethylthio)sulfamide, 1,2-benzisothiazoline-3-on, diiodomethyl-p-tolylsulfone, and methyl(benzimidazol-2-yl)carbamate, said polymer being a polyethylene copolymer resin which contains 72–95 wt % ethylene and 28–5 wt % vinyl acetate.

The polymeric foam safely exhibits its antibacterial and mildewproofing functions and hence is suitable for use as a cushioning material on the floor and wall and also as a material for building blocks and babies' toys.

6 Claims, 1 Drawing Sheet

POLYMERIC FOAM WITH ANTIBACTERIAL AND MILDEWPROOFING FUNCTIONS

BACKGROUND OF THE INVENTION

1. Field of the Invention

The present invention relates to a polymeric foam with antibacterial and mildewproofing functions and, more particularly to a polymeric foam with antibacterial and mildewproofing functions which contains an organic composite having a bactericidal action.

2. Description of the Prior Art

Plastics are subject to damages by microorganisms. To cope with this, plastics need antibacterial and mildewproofing treatments in many application areas. Plastics' vulnerability to attacks by microorganisms is due to additives, such as plasticizer, filler, antioxidant, stabilizer, slip agent, colorant, and modifier (which are incorporated into plastics) and auxiliaries, such as slip agent, flexibilizer, and mold release agent (which are added at the time of molding and fabrication).

One of plastic molded articles which needs the above-mentioned treatments is the polymeric foam of ethylene-vinyl acetate copolymer resin. The present inventors proposed a material for building blocks made of this polymeric foam, as disclosed in Japanese Patent Publication No. 15717/1992. Owing to its cellular structure, the material has good elastic properties.

OBJECT AND SUMMARY OF THE INVENTION

Because no attempts have ever been made to impart antibacterial action to the above-mentioned polymeric foam, the present inventors tried to incorporate it with an antibacterial agent.

Antibacterial agents applicable to polymeric foams are dominated by inorganic ones for safety. Unfortunately, they are effective against only ten-odd strains and they are not long-lasting. Moreover, they are poor in mildewproofing performance when the polymeric foam is attacked by bacteria.

The present inventors had polymeric foams containing an inorganic antibacterial agent tested for antibacterial action as follows:

(1) Tested by Kyoto Microorganisms Research Institute
(2) Samples
   (1) Polymeric foam containing 2% GZ*
   (2) Polymeric foam containing 3% GZ
   (3) Polymeric foam containing 5% GZ
   (4) Polymeric foam containing 2% GA*
   (5) Polymeric foam containing 3% GA
   *GZ and GA are trade names of inorganic antibacterial agents available from Kanebo Kasei.
(3) Test method
Tested by counting the number of live bacteria in the bacteria-containing liquid dropped on the surface of sample, after incubation at 25±5° C. under a cover glass.
(4) Strain tested
Escherichia IFO-12734

The results of the test are shown in Table 4.

TABLE 4

| Samples | Escherichia Viable count (initial) | Viable count (after 24 h) | Ratio of decrease (%) |
|---|---|---|---|
| (1) Polymeric foam containing 2% GZ | 3.7 × 10 | 2.9 × 10 | 21.62 |
| (2) Polymeric foam containing 3% GZ | 3.7 × 10 | 3.1 × 10 | 16.22 |
| (3) Polymeric foam containing 5% GZ | 3.7 × 10 | 2.5 × 10 | 32.43 |
| (4) Polymeric foam containing 2% GA | 3.7 × 10 | 2.6 × 10 | 29.73 |
| (5) Polymeric foam containing 3% GA | 3.7 × 10 | 1.4 × 10 | 62.16 |

It is noted from Table 4 that complete sterilization was not achieved within 24 hours in all the samples tested. This indicates that the inorganic antibacterial agents are poor in antibacterial action.

The present inventors investigated into antibacterial agents which are not only suitable for polymeric foams but also superior in antibacterial action while preventing the growth of fungi.

Since polymeric foams are exposed to high temperatures in their processing stage, it is necessary that the antibacterial agent be stale at such temperatures (or have good heat resistance) so that they fully exhibit their ability after processing. In addition, the antibacterial agent is required to be completely safe for human bodies if polymeric foams are to be used as a cushioning material on the floor and wall or as a material for flexible building blocks (which babies hold and lick).

With the foregoing in mind, the present inventors carried out extensive studies, which led to the finding that a certain organic composite satisfies the above-mentioned requirements. This organic composite remains stable and exhibits antibacterial action at temperatures from −60° C. to 390° C. As compared with conventional inorganic antibacterial agents, it exhibits better antibacterial action and mildewproofing function when incorporated into polymeric foams. The resulting polymeric foams remains invariably resistant to fungi as well as bacteria for a long period of time. The present invention is based on this finding.

DESCRIPTION OF THE PREFERRED EMBODIMENTS

Figure 1:
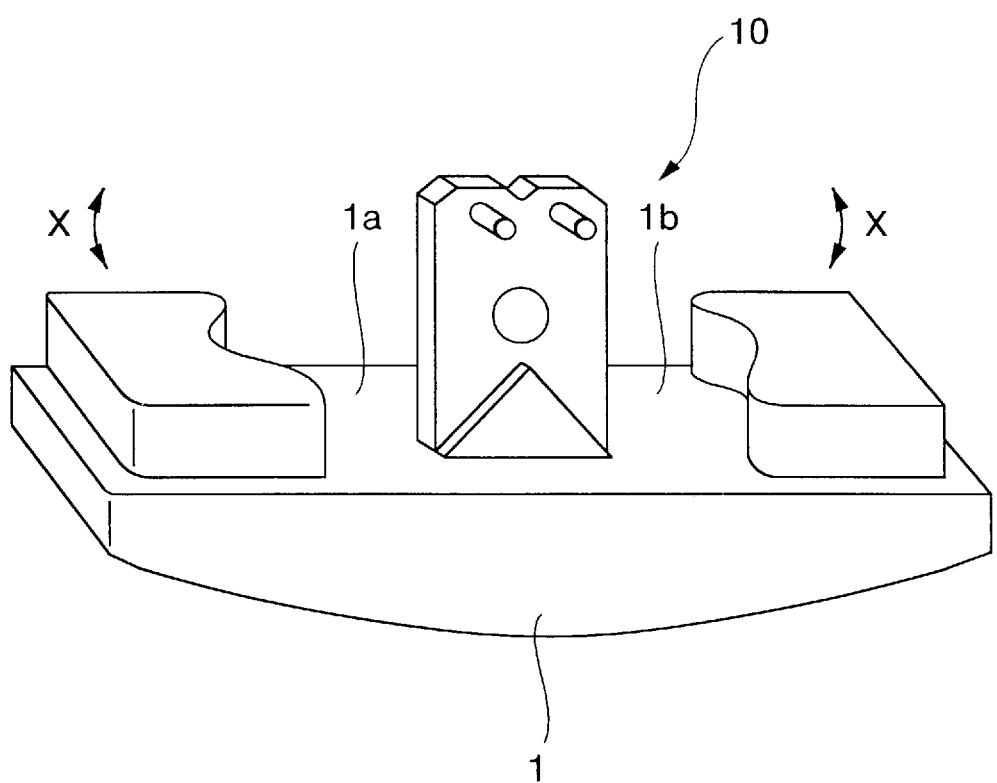
FIG. 1 is a perspective view of an indoor see-saw made of the polymeric foam of the present invention.

The present invention, which was completed to address the above-mentioned problem, resides in a polymeric foam with antibacterial and mildewproofing functions. The polymeric foam contains a small amount of organic composite having a bactericidal action. This organic composite is composed mainly of N,N-dimethyl-N'-phenyl-N'-(fluorodichloromethylthio)sulfamide, 1,2-benzisothiazoline-3-on, diiodomethyl-p-tolylsulfone, and methyl (benzimidazol-2-yl)carbamate. The polymer is an ethylene-vinyl acetate copolymer composed of 72–95 wt % ethylene and 28–5 wt % vinyl acetate.

The amount of the organic composite should preferably be 0.005–0.6 wt %. The polymeric foam is used as a cushioning material in the form of sheet (thicker than 5 mm)

placed on or bonded to the floor or wall. It may also be used as a material for toys such as building blocks.

The polymeric foam containing the organic composite as mentioned above offers the following features and advantages.
(1) Immunity from damage by hot foaming processing. Long-lasting antibacterial action without any adverse effect on the polymeric foam. (A probable reason for this is good miscibility of the copolymer with the organic composite.)
(2) Efficacy of the organic composite used in a small amount (which leads to reduced production cost).
(3) Long-lasting, stable bactericidal action on fungi as well as bacteria.
(4) Toxicity at a very low level.
(5) Negligibly small loss of the organic composite by leaching and evaporation.
(6) Suitable for use as a cushioning material for the floor and wall and also as a material for toys such as building blocks.

EXAMPLES

The invention will be described in more detail with reference to the following examples.

According to the present invention, the polymeric foam with antibacterial and mildewproofing functions is produced by foaming from a polymer incorporated with an organic composite having a bactericidal action. The organic composite is composed mainly of N,N-dimethyl-N'-phenyl-N'-(fluorodichloromethylthio)sulfamide, 1,2-benzisothiazoline-3-on, diidomethyl-p-tolylsulfone, and methyl (bezimidazol-2-yl) carbamate.

The polymeric foam of the present invention is formed from a polyethylene resin as the polymer. The polyethylene resin includes high-pressure polyethylenes and medium- and low-pressure polyethylenes, whose selection depends on the intended use. It also includes copolymers of ethylene with a variety of olefins and copolymers of ethylene with vinyl acetate or acrylic acid. These polyethylenes may be used alone or in combination with one another. Moreover, the polyethylene may be used in combination with any other thermoplastic resin, such as olefin polymer (other than polyethylene).

A preferred example of the polymer is a copolymer resin containing 72–95 wt % ethylene and 28–5 wt % vinyl acetate.

The polymer may contain such additives as plasticizer, stabilizer, filler, antioxidant, slip agent, coloring agent, and modifier. The resulting polymer compound is incorporated with the organic composite, and the resulting mixture is foamed under the condition established in consideration of the characteristic properties of the polymer. In this way there is obtained the polymeric foam of the present invention.

According to the present invention, the content of the organic composite in the polymeric foam should be in the range of 0.005 to 5.0 wt %, preferably 0.005 to 0.6 wt %, depending on the kind of the polymer used. With the content specified above, the organic composite disperses well into the foam and exhibits its antibacterial and mildewproofing effects for a long period of time without any adverse effect on the strength and characteristic properties of the polymeric foam itself.

The foaming can be accomplished by any method which is commonly used for the production of foams from polyethylene resins. An example of the foaming method is to use an inorganic or organic blowing agent, such as azodicarbonamide, benzylsulfodiphenylhydrazide, and p,p-oxybenzenesulfonylhydrazide, which give rise to gas upon thermal decomposition or chemical reaction.

The blowing agent may be used in combination with any crosslinking agent which is commonly used for the production of polyethylene resin foams. A typical crosslinking agent is an organic peroxide such as dicumyl peroxide and di-t-butyl peroxide. The blowing agent and crosslinking agent should be used in an amount of 3–10 pbw and 0.5–3 pbw, respectively, for 100 pbw of the polymeric compound.

The polymeric foam of the present invention can be produced by the ordinary heat-blowing process, which consists of mixing the individual components at 90°–120° C., introducing the resulting mixture into a closed mold under pressure, heating the mold at 180°–200° C., and opening the mold.

Examples 1 to 5 and Comparative Example 1

A resin compound was prepared by mixing the following components according to the formulation shown in Table 1.
Ethylene-vinyl acetate copolymer (containing 15 wt % vinyl acetate)
Chlorinated polyethylene (containing 40 wt % chlorine, from Osaka Soda Co., Ltd.)
Magnesium hydroxide (having an average particle diameter of 70 μm, from Kyowa Kagaku Kogyo Co., Ltd.)
Aluminum hydroxide (having an average particle diameter of 1 μm, from Showa Keikinzoku Co., Ltd.)
Calcium stearate
Organic composite The resulting resin compound (100 pbw) was mixed with azodicarbonamide (5.4 pbw) and dicumyl peroxide (1.3 pbw) by mastication for several minutes on a hot roll at 90°–120° C. The resulting mixture was introduced into a mold and heated at 180°–200° C. under pressure and finally the mold was depressurized instantly.

TABLE 1

| | Composition (wt %) | | | | | |
|---|---|---|---|---|---|---|
| | Ethylene-vinyl acetate copolymer | Chlorinated polyethylene | Calcium stearate | Aluminum hydroxide | Magnesium hydroxide | Organic composite |
| Example 1 | 36.55 | 5.3 | 4.1 | 32.6 | 21.4 | 0.05 |
| Example 2 | 36.55 | 5.3 | 4.1 | 32.55 | 21.4 | 0.1 |
| Example 3 | 36.52 | 5.3 | 4.1 | 32.53 | 21.35 | 0.2 |
| Example 4 | 36.45 | 5.3 | 4.1 | 32.45 | 21.3 | 0.4 |
| Example 5 | 36.37 | 5.3 | 4.1 | 32.38 | 21.25 | 0.6 |
| Comparative Example 1 | 36.6 | 5.3 | 4.1 | 32.6 | 21.4 | 0 |

Comparative Example 1 shown in Table 1 is identical with Examples 1 to 5 except that it was not incorporated with the organic composite.

The polymeric foams obtained in the above-mentioned examples were tested for mildewproofing performance according to MIL STD 810D, Method 508.3. This test method employs as the culture medium potato dextrose agar (PDA) containing no antibiotics such as chloramphenicol.

The culture medium was inoculated directly with the following mixed bacteria (suspension of pores). Incubation was carried out at 30±5° C. and 95±5 % RH for 42 days (maximum).

*Nigrospora oryzae*
*Cladosporium resinae*
*Cladosporium herbarum*
*Cladosporium cladosporioides*
*Cladosporium sphaerospermum*
*Trichoderma koningii*
Trichoderma T-1
*Trichoderma viride*
*Phoma glomerata*
*Phoma terrestius*
*Pulluraria pullulans*
*Gliocladium virens*
*Geotricham lactus*
*Geotricham candidum*
*Pestalotia adusta*
*Pestalotia neglecta*
*Myrothecium verrucaria*
*Alternaria tenuis*
*Alternaria brassicicola*
*Alternaria alternata*
*Aspergillus niger*
*Aspergillus flavus*
*Aspergillus versicolor*
*Aspergillus oryzae*
*Aspergillus terreus*
*Aspergillus fumigatus*
*Aureobasidium pullulans*
*Fusarium moniliforme*
*Fusarium semitectum*
*Fusarium proliferatum*
*Fusarium roseum*
*Fusarium solani*
*Fusarium oxysporum*
*Rhizopus nigricans*
*Rhizopus stronifer*
*Penicillium citrinum*
*Penicillium expansum*
*Penicillium funiculosum*
*Penicillium lilacinum*
*Penicillium nigricans*
*Penicillium frequentance*
*Penicillium citreoviride*
*Mucor racemosus*
*Eurotium tonophilum*
*Trichophyton mentagrophytes*
*Monilia fructigena*
*Chaetomium globosum*
*Epicoccum purpurascens*
*Acuremonium charticola*
*Wallemia sebi*
*Candida albicans*
*Streptoverticillium reticulum*
*Saccharomyces cerevisiae*
*Bacillus subtilis*
*Bacillus megaterium*
*Staphylococcus aureus*
*Pseudomonas aeruginosa*
*Pseudomonas fluorescens*
*Salmonella typhimurium*
*Escherichia coli*
*Botrytis cinera*
*Proteus vulgaris*

The mildewproofing performance was rated on a scale of 0 to 4 as shown in Table 2.

TABLE 2

| Rating | Growth of microorganisms |
| --- | --- |
| 0 | No growth observed at all. |
| 1 | Slight growth observed. |
| 2 | Some growth observed |
| 3 | Intermediate growth observed. |
| 4 | Remarkable grow observed. |

The results of the test for mildewproofing performance are shown in Table 3.

TABLE 3

| Sample | 7 days | 14 days | 21 days | 28 days | 42 days |
| --- | --- | --- | --- | --- | --- |
| Example 1 | 0 | 0 | 0 | 0 | 0 |
| Example 2 | 0 | 0 | 0 | 0 | 0 |
| Example 3 | 0 | 0 | 0 | 0 | 0 |
| Example 4 | 0 | 0 | 0 | 0 | — |
| Example 5 | 0 | 0 | 0 | 0 | — |
| Comparative Example 1 | 2 | 3 | 4 | 4 | — |

It is apparent from Table 3 that the polymeric foam incorporated with the organic composite produces the remarkable antibacterial and mildewproofing effect.

The polymeric foam of the present invention can be used as a material for babies' toys. An example of such toys is an indoor see-saw, whose perspective view is shown in FIG. 1. The see-saw 10 is made up of a swinging board 1 and two seats 1a, 1b, on which babies sit facing each other such that the see-saw 10 swings up and down in the direction of arrow X.

Effect of the Invention

As mentioned above, the polymeric foam of the present invention is made from a polymer and a small amount of organic composite having a bactericidal action. Therefore, the polymeric foam produces the remarkable, stable antibacterial and mildewproofing effect over a long period of time.

The organic composite used in the present invention is a safe chemical substance which has a very low level of toxicity and remains unchanged in characteristic properties at temperatures in the range of −60° C. to 390° C. while keeping its antibacterial power. The loss of the organic composite by leaching and evaporation is negligibly small; therefore, the polymeric foam can be used as a cushioning material on floors and walls, as a mat, or as a material for elastic building blocks and toys.

What is claimed is:

1. A polymeric foam which comprises a polymer and a small amount of organic composite having a bactericidal action contained therein, said organic composite being composed mainly of N,N-dimethyl-N'-phenyl-N'-(fluorodichloromethylthio)sulfamide, 1,2-benzisothiazoline-3-on, diiodomethyl-p-tolylsulfone, and methyl(benzimidazol-2-yl)carbamate, said polymer being a polyethylene copolymer resin which contains 72–95 wt % ethylene and 28–5 wt % vinyl acetate.

2. A polymeric foam having antibacterial and mildew-proofing functions as defined in claim 1, wherein the content of the organic composite is 0.005–0.6 wt %.

3. A polymeric foam as defined in claim 1, which is used (alone or in combination with one another connected side by side) in the form of sheet thicker than 5 mm as a cushioning material placed on or bonded to the floor or wall.

4. A polymeric foam as defined in claim 1, which is used as a material for building blocks and babies' toys.

5. A polymeric foam as defined in claim 2, which is used (alone or in combination with one another connected side by side) in the form of sheet thicker than 5 mm as a cushioning material placed on or bonded to the floor or wall.

6. A polymeric foam as defined in claim 2, which is used as a material for building blocks and babies' toys.

\* \* \* \* \*